(12) United States Patent
Xu

(10) Patent No.: US 9,940,010 B2
(45) Date of Patent: Apr. 10, 2018

(54) INFORMATION PROCESSING METHOD AND ELECTRONIC DEVICE

(71) Applicants: Beijing Lenovo Software Ltd., Beijing (CN); Lenovo (Beijing) Limited, Beijing (CN)

(72) Inventor: Ben Xu, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 272 days.

(21) Appl. No.: 14/674,588

(22) Filed: Mar. 31, 2015

(65) Prior Publication Data
US 2016/0139760 A1 May 19, 2016

(30) Foreign Application Priority Data

Nov. 19, 2014 (CN) .......................... 2014 1 0662863

(51) Int. Cl.
*G06F 3/0486* (2013.01)
*G06F 3/0488* (2013.01)
*G06F 1/16* (2006.01)

(52) U.S. Cl.
CPC .......... *G06F 3/0486* (2013.01); *G06F 1/1652* (2013.01); *G06F 3/0488* (2013.01)

(58) Field of Classification Search
None
See application file for complete search history.

(56) References Cited

U.S. PATENT DOCUMENTS

| 5,982,383 A * | 11/1999 | Kumar | G06F 3/04845 345/440 |
| 2010/0241955 A1* | 9/2010 | Price | G06F 3/0425 715/702 |
| 2012/0299909 A1* | 11/2012 | Ueno | G06F 3/0346 345/419 |
| 2014/0123191 A1* | 5/2014 | Hahn | H04N 5/44543 725/41 |
| 2014/0307395 A1* | 10/2014 | An | G06F 1/1652 361/749 |
| 2015/0234467 A1* | 8/2015 | Tachibana | G06F 3/017 715/863 |

FOREIGN PATENT DOCUMENTS

CN  103209274 A  7/2013

OTHER PUBLICATIONS

"Chinese Application No. 201410662863.5, Office Action dated Mar. 1, 2017", (Mar. 1, 2017), 6 pgs.

* cited by examiner

*Primary Examiner* — Tuan S Nguyen
(74) *Attorney, Agent, or Firm* — Schwegman Lundberg & Woessner, P.A.

(57) ABSTRACT

The present disclosure discloses an information processing method which includes: detecting a first drag and touch operation performed by a first operation body for moving a first object displayed in a first position on the touch display unit; acquiring a first end position of the first drag and touch operation on the touch display unit, the first end position is a position where the first operation body loses contact with the touch display unit during the first drag and touch operation; and maintaining the first object to be in a selected state in the first end position for a preset duration, and displaying the first object in the first end position.

7 Claims, 5 Drawing Sheets

INFORMATION PROCESSING METHOD AND ELECTRONIC DEVICE

CROSS-REFERENCE TO RELATED APPLICATION(S)

This application claims priority to the Chinese Patent Application No. 201410662863.5, filed on Nov. 19, 2014, entitled "INFORMATION PROCESSING METHOD AND ELECTRONIC DEVICE", which is incorporated herein by reference in its entirety.

TECHNICAL FIELD

The present disclosure relates to the field of electronic technology, and in particular, to an information processing method and an electronic device.

BACKGROUND

With continuous development of science technology, an electronic device with a touch display unit such as a mobile phone with a touch screen, a tablet computer has been widely applied in people's daily life. At the same time, in order to satisfy use requirements, application software is also increasing, which results in increasing application program icons on an interactive interface of the touch display unit. When it is inconvenient for a user to use a position where an application program icon is located, it needs to adjust the position of the application program icon.

To this end, conventionally, the electronic device with a touch display unit allows a user to manage the position of the application program icon. For example, there is some instant messaging software such as QQ, WeChat, MoMo or the like, and the electronic device allows a user to perform some operations to adjust the positions of program icons of QQ, WeChat, MoMo, so that the program icons move to new positions. The specific implementation is as follows.

Firstly, a user's finger is used to select a program icon of QQ through a touch operation, and drag the selected program icon of QQ to a position desired for the user;

Then, when the position desired for the user is reached, if the user's finger loses contact with the touch display unit, the program icon of QQ moves from the original position to the current position.

The inventor of the present disclosure discovers the following technical problems in the conventional solutions when implementing the technical solutions according to the embodiments of the present disclosure:

In the process of moving an object on the electronic device from a position to a destination position based on a drag and touch operation, the program icon fails to be moved, if an operation body loses contact with the touch display unit when the drag and touch operation does not arrive at the destination position. In this case, the application program icon restores to the start position. Therefore, the user needs to repeat the drag operation.

The above condition will occur in the process of performing an operation on all electronic devices with a touch screen, especially in the process of using a touch display screen made of a flexible material. After the flexible screen is bent to a curved surface, the misoperation of a user's finger falling off the touch display unit is easy to occur, as it needs to continuously lift and drop the user's finger on the screen due to the curved surface, when the user desires to move an application program icon.

In conclusion, the following condition often occurs in the conventional electronic device: before the icon is dragged to a position desired for a user, the application program icon is restored to a start position due to improper operation of the user's finger during a touch operation on a screen, for example, the finger leaves the screen.

Thus, there is a technical problem in the related art that the object may be moved to a destination position only if the electronic device responds to multiple drag operations.

SUMMARY

In an aspect, the embodiments of the present disclosure provide an information processing method comprising:

detecting a first drag and touch operation performed by a first operation body for moving a first object displayed in a first position on the touch display unit;

acquiring a first end position of the first drag and touch operation on the touch display unit, the first end position is a position where the first operation body loses contact with the touch display unit during the first drag and touch operation; and maintaining the first object to be in a selected state in the first end position for a preset duration, and displaying the first object in the first end position.

Alternatively, the first drag and touch operation is a touch operation of touching, by the first operation body, the first object on the touch display unit for a first touch duration greater than a preset touch duration, and dragging the first object.

Alternatively, after maintaining the first object to be in a selected state in the first end position for a preset duration, and displaying the first object in the first end position, the method further comprises:

judging whether the first operation body performs a second drag and touch operation within the preset duration;

if the first operation body performs the second drag and touch operation within the preset duration, displaying the first object at a second position of the touch display unit, the second position corresponding to a second end position where the first operation body loses contact with the touch display unit during the second drag and touch operation;

if the first operation body does not perform the second drag and touch operation within the preset duration, displaying the first object at a third position of the touch display unit.

Alternatively, displaying the first object at the third position comprises:

acquiring a first distance between the first end position and a preset position;

if the first distance is less than or equal to a preset distance, then displaying the first object at the preset position, the preset position being the third position.

Alternatively, if the touch display unit is made of a flexible material and is in a deformed state, after maintaining the first object to be in a selected state in the first end position for a preset duration, and displaying the first object in the first end position, the method further comprises:

adjusting the touch display unit from the deformed state to a flat state.

In an aspect, the embodiments of the present disclosure provide an electronic device comprising: a touch display unit; and a processor configured to:

detect a first drag and touch operation performed by a first operation body for moving a first object displayed in a first position on the touch display unit;

acquire a first end position of the first drag and touch operation on the touch display unit, the first end position being a position where the first operation body loses contact with the touch display unit during the first drag and touch operation; and maintain the first object to be in a selected state in the first end position for a preset duration, and display the first object in the first end position.

Alternatively, the processor is further configured to:

judge whether the first operation body performs a second drag and touch operation within the preset duration;

display the first object at a second position of the touch display unit if the first operation body performs the second drag and touch operation within the preset duration, the second position corresponding to a second end position of the second drag and touch operation, the second end position being a position where the first operation body loses contact with the touch display unit during the second drag and touch operation;

display the first object at a third position of the touch display unit if the first operation body does not performs the second drag and touch operation within the preset duration.

Alternatively, the processor is further configured to:

acquire a first distance between the first end position and a preset position; and display the first object at the preset position if the first distance is less than or equal to a preset distance, the preset position being the third position.

Alternatively, the touch display unit is a touch display unit made of a flexible material.

Alternatively, the electronic device further comprises a first adjustment unit configured to adjust the touch display unit from a deformed state to a flat state.

In an aspect, the embodiments of the present disclosure provide a computer readable storage medium, which comprises instructions executable by a data processing device to perform:

detecting a first drag and touch operation performed by a first operation body for moving a first object displayed in a first position on the touch display unit;

acquiring a first end position of the first drag and touch operation on the touch display unit, the first end position is a position where the first operation body loses contact with the touch display unit during the first drag and touch operation; and maintaining the first object to be in a selected state in the first end position for a preset duration, and displaying the first object in the first end position.

BRIEF DESCRIPTION OF THE DRAWINGS

In order to illustrate technical solutions in the embodiments of the present disclosure or in the prior art more clearly, accompanying drawings needed to be used in the description of the embodiments or the related art will be described below in brief. Obviously, the accompanying drawings described below are merely some embodiments of the present disclosure. A person having ordinary skill in the art can further obtain other accompanying drawings according to these accompanying drawing without contributing any creative labor.

DETAILED DESCRIPTION

Figure 1:
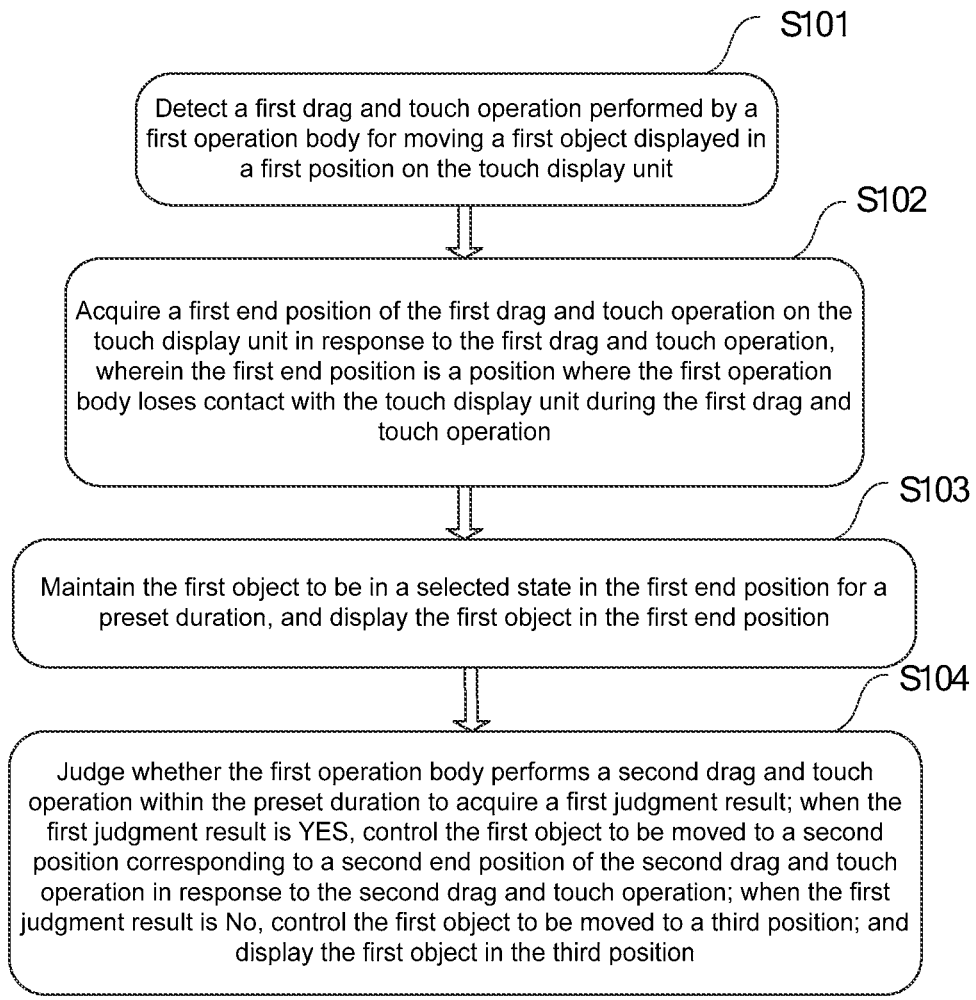
FIG. 1 is a flowchart of an information processing method according to a first embodiment of the present disclosure.

The embodiments of the present disclosure provide an information processing method and an electronic device to solve the technical problem in the related art that the object may be moved to a destination position only if the electronic device responds to multiple drag operations, and achieve technical effects that the operation can be continuously performed from a position where the operation body loses contact with the touch display unit when performing a next touch operation.

In order to solve the above technical problem, the general concept of the technical solutions according to the embodiments of the present application is as follows.

The present disclosure provides an information processing method applied in an electronic device including a touch display unit, the method comprising: detecting a first drag and touch operation performed by a first operation body for moving a first object displayed in a first position on the touch display unit; acquiring a first end position of the first drag and touch operation on the touch display unit in response to the first drag and touch operation, wherein the first end position is a position where the first operation body loses contact with the touch display unit in the process of the first drag and touch operation; and maintaining the first object to be in a selected state in the first end position within a preset duration, and displaying the first object in the first end position.

In the above technical solution, when the first operation body loses contact with the touch display unit in the process of the first drag and touch operation, the first object is controlled to maintain in a selected state in the position where the first body loses contact with the touch display unit within a preset duration. In this way, when the first operation body performs a next operation, the operation may be performed directly from the position where the operation body loses contact with the touch display unit, without performing the drag operation again from the start position of the first object. Therefore, the present disclosure solves the technical problem in the related art that the object may be moved to a destination position only if the electronic device responds to multiple drag operations, and achieves technical effects that the operation can be continuously performed from a position where the operation body loses contact with the touch display unit when performing a next touch operation.

For better understanding the above technical solutions, the technical solutions of the present disclosure will be described in detail below in conjunction with accompanying drawings and specific embodiments. It should be understood that embodiments in the present disclosure and specific features in the embodiments are used to set forth the technical solutions of the present disclosure in detail, instead of limiting the technical solutions of the present disclosure. Without a conflict, the embodiments in the present disclosure and the technical features in the embodiments can be combined with each other.

First Embodiment

As shown in FIG. 1, the embodiment of the present disclosure provides an information processing method applied in an electronic device including a touch display unit, the method comprising:

S101: detecting a first drag and touch operation performed by a first operation body for moving a first object displayed in a first position on the touch display unit;

S102: acquiring a first end position of the first drag and touch operation on the touch display unit in response to the first drag and touch operation, wherein the first end position is a position where the first operation body loses contact with the touch display unit during the first drag and touch operation; and S103: maintaining the first object to be in a selected state in the first end position for a preset duration, and displaying the first object in the first end position;

S104: judging whether the first operation body performs a second drag and touch operation within the preset duration to acquire a first judgment result;

when the first judgment result is YES, controlling the first object to be moved to a second position corresponding to a second end position of the second drag and touch operation in response to the second drag and touch operation;

when the first judgment result is No, controlling the first object to be moved to a third position; and displaying the first object in the third position.

Figure 2A:
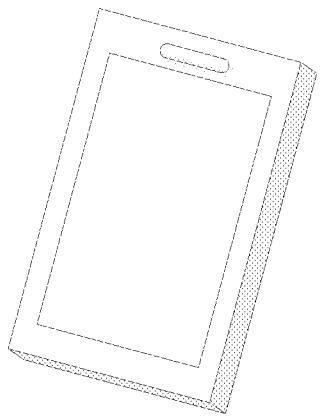
FIG. 2A is a diagram of an electronic device being in a first state according to the first embodiment of the present disclosure.
Figure 2B:
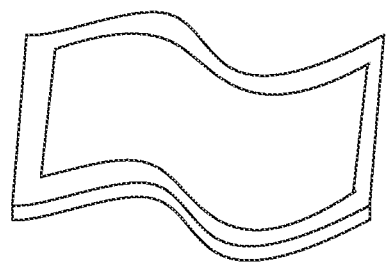
FIG. 2B is a diagram of an electronic device being in a second state according to the first embodiment of the present disclosure.

In a specific implementation, the electronic device may specifically be an intelligent mobile phone, a table computer, or another electronic device having a touch display unit. The touch display unit may be a flat display screen made of a hard material, or a flexible screen which is made of a flexible material and has a changeable shape, as shown in FIGS. 2A-2B, and will not be enumerated herein. In the embodiment of the present disclosure, the implementation of the method according to the embodiment of the present disclosure will be described in detail by taking a tablet computer being the electronic device and a flexible screen made of a flexible material being the touch display unit as an example.

Figure 3:
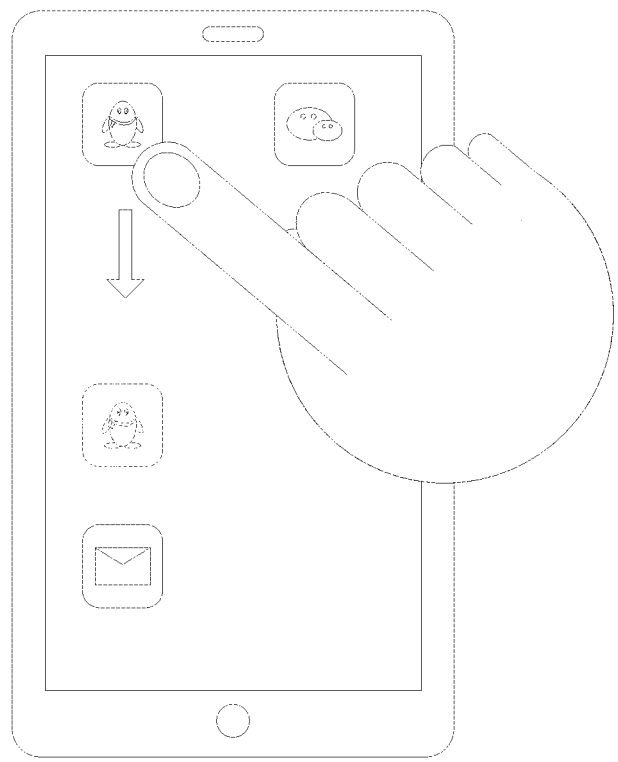
FIG. 3 is a diagram of a specific implementation of step S101 according to the first embodiment of the present disclosure.

In the embodiment of the present disclosure, by taking a table computer being the electronic device and a flexible screen made of a flexible material being the touch display unit as an example, the specific implementation of step S101 is that when the table computer is in an operational state for operation by a user, the tablet computer detects that a user's finger or a stylus touches an application program icon or a widget on the flexible screen, and performs a first touch and drag operation. In a specific implementation, the application program icon is specifically a shortcut icon of application software such as QQ, WeChat, Sina or the like on the display screen, and the widget may specifically be a weather module, a calendar module, a bookmark, a clock or the like on the display screen. The first drag and touch operation is specifically a touch operation of touching, by the first operation body, the first object on the touch display unit within a first touch duration greater than a preset touch duration, and dragging the first object. For example, the user' finger touches the shortcut icon of the QQ software and stays in the position where the shortcut icon is located within a period of time such as 1 second, 2 seconds or another duration. At this time, the shortcut icon of QQ is in a selected state, and the user's finger moves the icon from an upper left position to a lower left position or any other position in the display screen, with reference to FIG. 3. Alternatively, the user may use a style to drag a weather module located on the first page of the display screen to a position on the second page of the display screen in the same manner as described above. Of course, in a specific implementation, a person having ordinary skill in the art can perform the first drag and touch operation in another manner, which will not be described here.

After step S101 is performed, step S102 in the method according to the embodiment of the present disclosure will be performed, which comprises: acquiring a first end position of the first drag and touch operation on the touch display unit in response to the first drag and touch operation, wherein the first end position is a position where the first operation body loses contact with the touch display unit during the first drag and touch operation.

Still by taking a tablet computer being the electronic device and a flexible screen made of a flexible material being the touch display unit as an example, in a specific implementation, a central processor of the tablet computer moves the shortcut icon of QQ in accordance with a movement trajectory of the user's finger in response to the movement operation, when a user performs a first drag and touch operation, for example, the user moves the shortcut icon of QQ from the upper left corner of the screen, and a sensor of the flexible screen considers the position where the user's finger loses contact with the flexible screen, i.e., the position where a touch point disappears, as the end position of the first drag and touch operation, when the user's finger loses contact with the flexible screen in the movement process as the flexible screen is in a curved state or due to misoperation, and at the same time, controls the shortcut icon of QQ to be moved to the position where the touch point disappears.

After step S102 is performed, step S103 in the method according to the embodiment of the present disclosure will be performed, which comprises: controlling the first object to be in a selected state in the first end position within a preset duration, and displaying the first object in the first end position.

Figure 4:
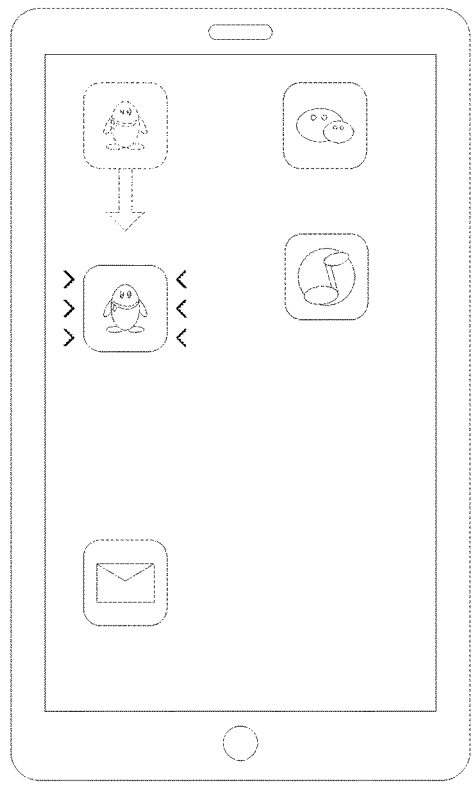
FIG. 4 is a diagram of a specific implementation of step S103 according to the first embodiment of the present disclosure.

Still by taking a tablet computer being the electronic device and a flexible screen made of a flexible material being the touch display unit as an example, in a specific implementation, the touch point which controls the shortcut icon of QQ disappears, when the shortcut icon of QQ moves to the end position of the first drag and touch operation and the user's finger loses contact with the flexible screen. In this case, the central processor of the tablet computer controls the shortcut icon of QQ to still stay in the position where the touch point disappears, and maintain the shortcut icon of QQ to be in a selected state within a certain period of time, for example, maintain the shortcut icon of QQ to be in a selected state or jittering state within 5 seconds. In this case, the flexible screen displays that the shortcut icon of QQ is in a selected state or jittering state in the position where the user's finger loses contact with the flexible screen, as shown in FIG. 4.

After step S103 is performed, step S104 in the method according to the embodiment of the present disclosure will be preformed, which comprises:

judging whether the first operation body performs a second drag and touch operation within the preset duration to acquire a first judgment result;

when the first judgment result is YES, controlling the first object to be moved to a second position corresponding to a second end position of the second drag and touch operation in response to the second drag and touch operation;

when the first judgment result is No, controlling the first object to be moved to a third position; and displaying the first object in the third position.

Figure 5:
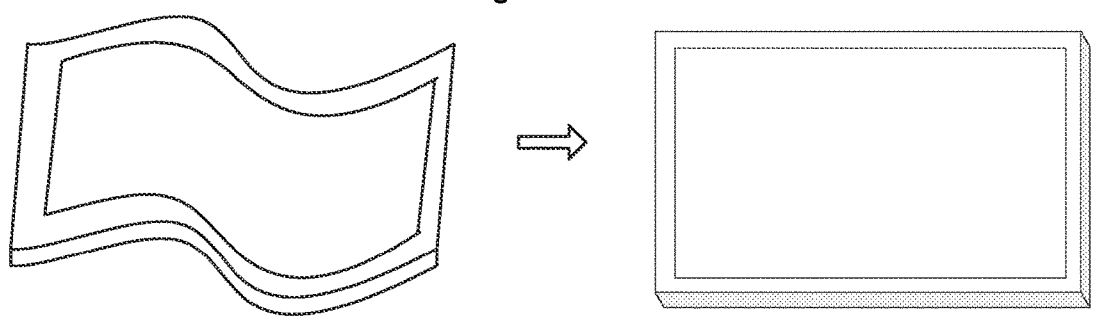
FIG. 5 is a diagram of a specific implementation of adjusting a touch display unit from a deformed state to a flat state according to the first embodiment of the present disclosure.

Still by taking a tablet computer being the electronic device and a flexible screen made of a flexible material being the touch display unit as an example, in a specific implementation, misoperation may occur again when the user performs a drag and touch operation, i.e., the user's finger loses contact with the flexible screen before arriving at the destination position, when the flexible screen is in a deformed state, i.e., a non-flat state. In this case, the touch display unit may firstly be adjusted from the deformed state to a flat state, as shown in FIG. 5, step S104 is then performed.

Figure 6:
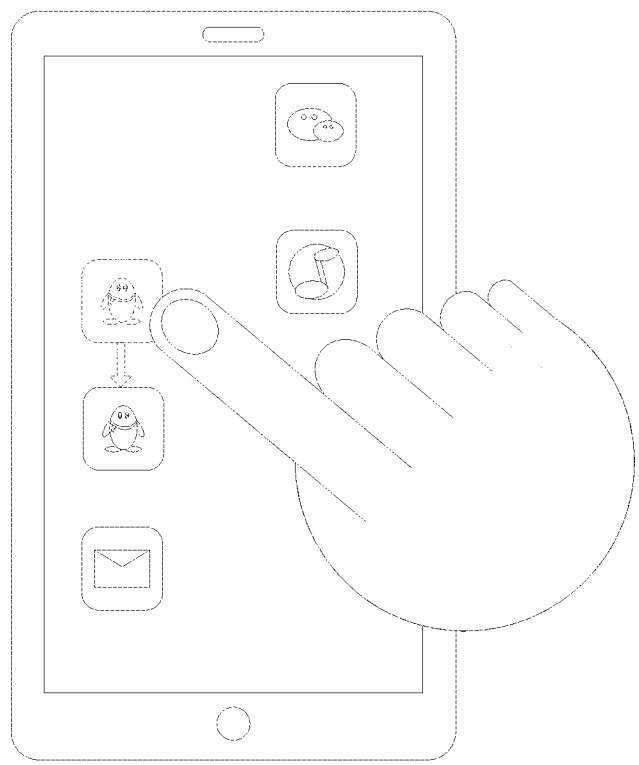
FIG. 6 is a diagram of a specific implementation of step S104 according to the first embodiment of the present disclosure.

In the embodiment of the present disclosure, the flexible screen detects whether there is a second drag and touch operation performed by a user on the shortcut icon of QQ within 5 seconds, for example, whether the user performs a second drag and touch operation to move the shortcut icon of QQ from the current position of the shortcut icon of QQ within 5 seconds while the central processor of the tablet computer controls the shortcut icon of QQ to remain in the selected state in the position where the user's finger loses contact with the flexible screen within a preset duration, such as 5 seconds. After the flexible screen detects a second drag and touch operation performed by the user for moving the shortcut icon of QQ, the central processor of the tablet computer moves the shortcut icon of QQ in accordance with a movement trajectory of the user's finger in response to the second drag and touch operation, and after the flexible screen detects that the user's finger loses contact with the flexible screen again, the central processor of the tablet computer moves the shortcut icon of QQ to the position where the user's finger loses contact with the flexible screen. At this time, the operation of moving the shortcut icon of QQ is completed, as shown in FIG. 6.

In a specific implementation, when it is detected that the user's finger loses contact with the flexible screen again, the central processor of the tablet computer may also use the same manner as step S103, to control the shortcut icon of QQ to stay in the position where the user's finger loses contact with the flexible screen and maintain for a preset duration, to wait for a next drag and touch operation of the user. Of course, those skilled in the art may limit the number of times for controlling the icon to stay in the position where the touch point disappears. For example, when the number of times is limited to 3, no matter whether the user arrives at the destination position desired for the user after the third drag and touch operation is completed, the icon is moved to the end position of the third drag and touch operation without controlling the icon to stay.

In the embodiment of the present disclosure, after the central processor of the tablet computer controls the shortcut icon of QQ to remain in the selected state in the position where the user's finger loses contact with the flexible screen within a preset duration, such as 5 seconds, the flexible screen does not detect a second drag and touch operation performed by the user on the shortcut icon of QQ within 5 seconds. In this case, the central processor of the tablet computer controls the first object to be moved to the third position, i.e., controls the shortcut icon of QQ to be moved to the third position.

In a specific implementation, controlling the first object to be moved to the third position further comprises:

acquiring a first distance difference between the first end position and a preset position; and when the first distance difference is less than or equal to a preset distance difference, controlling the first object to be moved to the preset position, the preset position being the third position.

Figure 7:
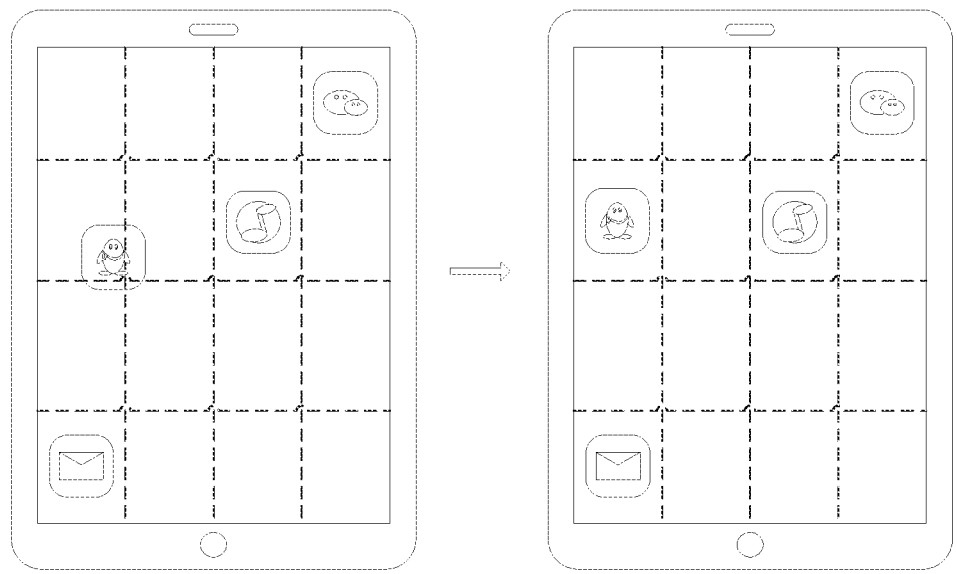
FIG. 7 is a diagram of a specific implementation of the information processing method according to the first embodiment of the present disclosure after it is detected that there is no second drag and touch operation.

Still by taking a tablet computer being the electronic device as an example, the central processor of the tablet computer compares the first end position where the user loses contact with the flexible screen with central positions of grids around the first end position to acquire distance differences between the first end position and centers of various surrounding grids, and compares various distance differences with a preset distance difference, when the flexible screen does not detect a second drag and touch operation performed by the user for moving the shortcut icon of QQ within 5 seconds. For example, the preset distance difference may be set as 0.4 of a grid. In this case, when it finds that a distance difference is less than 0.4 of a grid, the shortcut icon of QQ is moved to a grid position with a distance difference less than 0.4 of a grid, to complete the operation of moving the shortcut icon of QQ. In a specific implementation, the preset distance difference may also not be set, and the shortcut icon of QQ is moved to a grid position corresponding to a minimum of the distance differences, as shown in FIG. 7, which is not limited herein.

Second Embodiment

Figure 8:
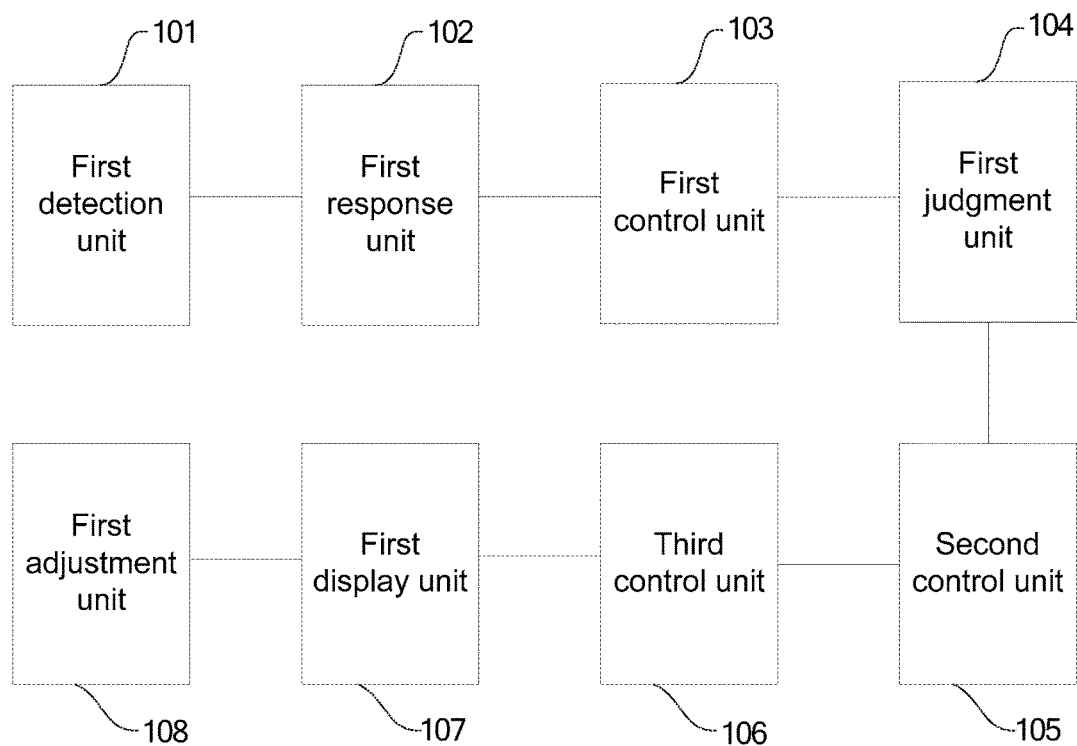
FIG. 8 is a structural block diagram of an electronic device according to a second embodiment of the present disclosure.

Based on the same inventive concept as the information processing method according to the first embodiment of the present disclosure, the embodiment of the present disclosure provides an electronic device including a touch display unit, as shown in FIG. 8, the electronic device comprising:

a first detection unit 101 configured to detect a first drag and touch operation performed by a first operation body for moving a first object displayed in a first position on the touch display unit;

a first response unit 102 configured to acquire a first end position of the first drag and touch operation on the touch display unit in response to the first drag and touch operation, wherein the first end position is a position where the first operation body loses contact with the touch display unit during the first drag and touch operation; and a first control unit 103 configured to control the first object to be in a selected state in the first end position within a preset duration, and display the first object in the first end position.

The electronic device further comprises:

a first judgment unit 104 configured to judge whether the first operation body performs a second drag and touch operation within the preset duration to acquire a first judgment result;

a second control unit 105 configured to, when the first judgment result is YES, control the first object to be moved a second position corresponding to a second end position of the second drag and touch operation in response to the second drag and touch operation;

a third control unit 106 configured to, when the first judgment result is No, control the first object to be moved to a third position; and a first display unit 107 configured to display the first object in the third position.

In order to control the first object to be moved to the third position, the third control unit 106 further comprises:

a first acquisition sub-unit configured to acquire a first distance difference between the first end position and a preset position; and a first control sub-unit configured to, when the first distance difference is less than or equal to a preset distance difference, control the first object to be moved to the preset position, the preset position being the third position.

For ease of carrying and using, the touch display unit is a touch display unit made of a flexible material.

In order to adjust a state of the touch display unit, the electronic device further comprises:

a first adjustment unit 108 configured to adjust the touch display unit from the deformed state to a flat state.

The above technical solutions according to the embodiments of the present disclosure provide at least the following technical effects.

Firstly, with the technical solutions according to the embodiments of the present disclosure, the first object is controlled to maintain in a selected state in the position where the first operation body loses contact with the touch display unit within a preset duration, when the first operation body loses contact with the touch display unit during the first drag and touch operation. In this way, the operation is performed directly from the position where the first operation body loses contact with the touch display unit without performing the drag operation again from the start position of the first object, when the first operation body performs a next operation. Therefore, the present disclosure solves the technical problem in the related art that the object may be moved to a destination position only if the electronic device responds to multiple drag operations, and achieves technical effects that the operation can be continuously performed from a position where the operation body loses contact with the touch display unit when performing a next touch operation.

Secondly, with the technical solutions according to the embodiments of the present disclosure, the first object is controlled to maintain in a selected state in the position where the first operation body loses contact with the touch display unit. In this way, after the first operation body loses contact with the touch display unit even when the drag and touch operation does not arrive at the destination position, the first operation body only needs to drag the object from the position where the first operation body loses contact with the touch display unit to move the first object to the destination position once, without requiring the first operation body to repeatedly perform an operation many times. Therefore, the present disclosure achieves the technical effects of performing a drag operation in many processes.

Thirdly, with the technical solutions according to the embodiments of the present disclosure, the first object is controlled to maintain in a selected state in the position where the first operation body loses contact with the touch display unit within a preset duration, when the first operation body loses contact with the touch display unit during the first drag and touch operation. In this way, the operation body may continue to drag the first object after the last operation.

Therefore, the present disclosure achieves the technical effects of short operation time and good user experience.

Those skilled in the art should appreciate that the embodiments of the present disclosure can be provided as methods, systems, or computer program products. Therefore, forms such as hardware-only embodiments, software-only embodiments, or embodiments combining software and hardware can be used in the present disclosure. In addition, forms such as a computer program product which is implemented on one or more of computer usable storage media (comprising but not limited to a disk memory, a CD-ROM, an optical memory etc.) with computer usable program codes can be used in the present disclosure.

The present disclosure is described with reference to the flowcharts and/or block diagrams of the methods, devices (systems) and computer program products according to the embodiments of the present disclosure. It should be understood that each flow and/or block in the flowcharts and/or block diagrams as well as a combination of the flows and/or blocks in the flowcharts and/or block diagrams can be implemented by computer program instructions. These computer program instructions can be provided to a processor of a general-purpose computer, a dedicated-purpose computer, an embedded processor, or other programmable data processing devices to generate a machine. Thereby, the instructions executed by the processor of the computer or other programmable data processing devices generate means for implementing functions specified in one or more flows in the flowcharts and/or one or more blocks in the block diagrams.

These computer program instructions can also be stored in a computer readable memory capable of introducing a computer or other programmable data processing devices to operate in a particular mode. Thereby, the instructions stored in the computer readable memory generate an article of manufacture comprising instruction means for implementing functions specified in one or more flows in the flowcharts and/or one or more blocks in the block diagrams.

These computer program instructions can also be loaded onto a computer or other programmable data processing devices, so as to enable a series of operation steps to be performed on the computer or other programmable devices to generate a computer-implemented process. Thereby, the instructions executed on the computer or other programmable devices provide a step of implementing functions specified in one or more flows in the flowcharts and/or one or more blocks in the block diagrams.

Specifically, computer program instructions corresponding to the information processing method according to some embodiments of the present disclosure may be stored on a storage medium such as an optical disk, a hard disk, a USB device etc. When the computer program instructions in the storage medium corresponding to the information processing method are read or executed by an electronic device, the following steps are performed:

detecting a first drag and touch operation performed by a first operation body for moving a first object displayed in a first position on the touch display unit;

acquiring a first end position of the first drag and touch operation on the touch display unit in response to the first drag and touch operation, wherein the first end position is a position where the first operation body loses contact with the touch display unit during the first drag and touch operation; and controlling the first object to be in a selected state in the first end position within a preset duration, and displaying the first object in the first end position.

Alternatively, after computer instructions stored in the storage medium, which correspond to the step of controlling the first object to be in a selected state in the first end position within a preset duration, and displaying the first object in the first end position, are executed, the following steps are further performed:

judging whether the first operation body performs a second drag and touch operation within the preset duration to acquire a first judgment result;

when the first judgment result is YES, controlling the first object to be moved to a second position corresponding to a second end position of the second drag and touch operation in response to the second drag and touch operation;

when the first judgment result is No, controlling the first object to be moved to a third position; and displaying the first object in the third position.

Alternatively, when computer instructions stored in the storage medium, which correspond to the step of controlling the first object to be moved to a third position, are executed, the following steps are further performed:

acquiring a first distance difference between the first end position and a preset position; and when the first distance difference is less than or equal to a preset distance difference, controlling the first object to be moved to the preset position, the preset position being the third position.

Alternatively, after computer instructions stored in the storage medium, which correspond to the step of when the touch display unit is made of a flexible material and is in a deformed state, controlling the first object to be in a selected state in the first end position within a preset duration, and displaying the first object in the first end position, are executed, the following steps are further performed:

adjusting the touch display unit from the deformed state to a flat state.

Although preferable embodiments of the present disclosure have been described, additional changes and modifications can be made to these embodiments by those skilled in the art upon learning the basic creative concepts. Therefore, the appended claims are intended to be construed as comprising the preferable embodiments and all changes and modifications that fall into the scope of the present disclosure.

Obviously, those skilled in the art can make various modifications and variations to the present disclosure without departing from the spirit and scope of the present disclosure. Thus, if these modifications and variations of the present disclosure belong to the scope of the claims of the present disclosure and the equivalent technologies thereof, the present disclosure is also intended to include these modifications and variations.

I claim:

1. An information processing method, comprising:
    detecting a first drag and touch operation performed by a first operation body for moving a first object displayed in a first position on a touch display unit of an electronic device, the first drag and touch operation being a touch operation of touching, by the first operation body, the first object on the touch display unit for a first touch duration greater than a preset touch duration, and dragging the first object;
    acquiring a first end position of the first drag and touch operation on the touch display unit, the first end position being a position where the first operation body loses contact with the touch display unit by a deform surface during the first drag and touch operation;
    maintaining the first object to be in a selected state in the first end position for a preset duration, and displaying the first object in the first end position;
    judging whether the first operation body performs a second drag and touch operation within the preset duration to display the object at the second position;
    when the first operation body performs the second drag and touch operation within the preset duration, displaying the first object at a second position of the touch display unit, the second position of the touch display unit corresponding to a second end position of the second drag and touch operation, the second end position being a position where the first operation body loses contact with the touch display unit during the second drag and touch operation; and
    when the first operation body does not performs the second drag and touch operation within the preset duration, displaying the first object at a third position of the touch display unit, wherein the third position is a preset position.

2. The method according to claim 1, wherein, displaying the first object at the third position comprises: acquiring a first distance between the first end position and a preset position; when the first distance is less than or equal to a preset distance, displaying the first object at the preset position, the preset position being the third position.

3. An electronic device comprising:
    a touch display unit; and
    a processor configured to:
    detecting a first drag and touch operation performed by a first operation body for moving a first object displayed in a first position on a touch display unit of an electronic device, the first drag and touch operation being a touch operation of touching, by the first operation body, the first object on the touch display unit for a first touch duration greater than a preset touch duration, and dragging the first object;
    acquiring a first end position of the first drag and touch operation on the touch display unit, the first end position being a position where the first operation body loses contact with the touch display unit by a deform surface during the first drag and touch operation;
    maintaining the first object to be in a selected state in the first end position for a preset duration, and displaying the first object in the first end position;
    judging whether the first operation body performs a second drag and touch operation within the preset duration to display the object at the second position;
    displaying the first object at a second position of the touch display unit when the first operation body performs the second drag and touch operation within the preset duration, the second position of the touch display unit corresponding to a second end position of the second drag and touch operation, the second end position being a position where the first operation body loses contact with the touch display unit during the second drag and touch operation; and
    displaying the first object at a third position of the touch display unit when the first operation body does not performs the second drag and touch operation within the preset duration, wherein the third position is a preset position.

4. The electronic device according to claim 3, wherein the processor is further configured to:
    acquire a first distance between the first end position and a preset position; and display the first object at the preset position when the first distance is less than or equal to a preset distance, the preset position being the third position.

5. The electronic device according to claim 4, wherein the touch display unit is made of a flexible material.

6. The electronic device according to claim 5, wherein the processor is configured to adjust the touch display unit from a deformed state to a flat state.

7. A non-transitory computer readable storage medium, comprising instructions executable by a data processing device to perform the steps of claim 1.

* * * * *